UNITED STATES PATENT OFFICE.

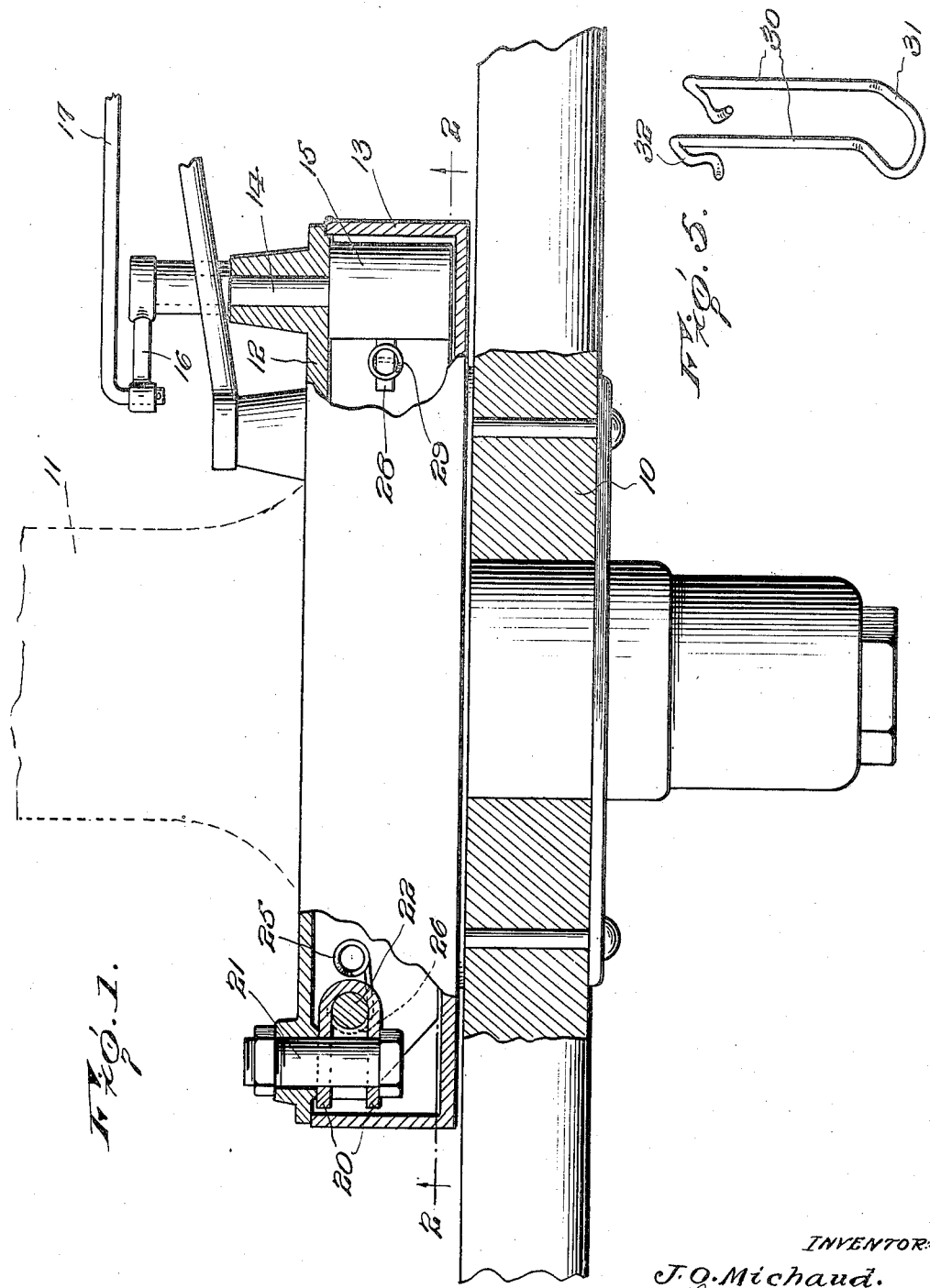

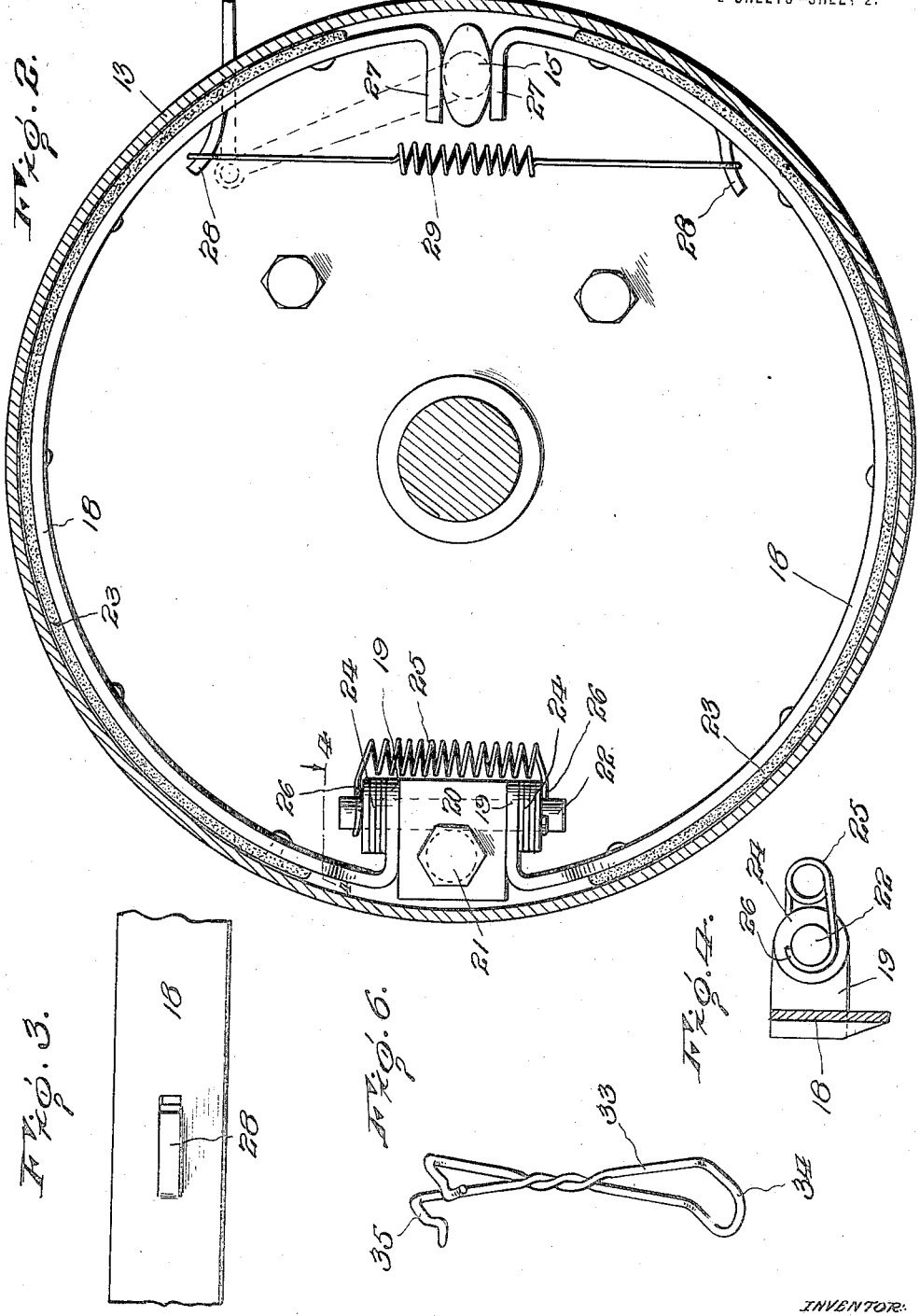

JOSEPH O. MICHAUD, OF FORT KENT, MAINE.

INTERNAL EXPANDING BRAKE.

1,397,225.  Specification of Letters Patent.  Patented Nov. 15, 1921.

Application filed May 10, 1919. Serial No. 296,279.

*To all whom it may concern:*

Be it known that I, JOSEPH O. MICHAUD, citizen of the United States, residing at Fort Kent, in the county of Aroostook and State of Maine, have invented certain new and useful Improvements in Internal Expanding Brakes, of which the following is a specification.

This invention relates to an improved expanding brake for motor vehicles and has as one of its principal objects to provide a construction wherein the companion brake shoes employed may be readily adjusted for taking up wear in the brake linings.

The invention has as a further object to provide an arrangement wherein the brake shoes will be mounted upon a common supporting pin therefor and will be removably held upon the pin by an improved retaining clip engaged directly with the pin.

And the invention has as a still further object to provide an arrangement wherein the retaining clip will also secure a supply of washers or liners normally inactive upon the pin and wherein the clip may be readily removed so that one or more of the washers may be disposed beneath the inner ends of the brake shoes for spreading the shoes when the clip may be again applied for holding the shoes and liners upon the pin.

Other and incidental objects will appear hereinafter:

In the drawings:

Figure 1 is a fragmentary plan view illustrating my improved brake in connection with one rear wheel of a conventional type of motor vehicle, parts being broken away and shown in section, Fig. 2 is a sectional view taken on the line 2—2 of Fig. 1 and looking in the direction of the arrows, Fig. 3 is a detail view illustrating the manner in which the brake shoes are formed adjacent their outer ends with lugs punched in to receive the spring employed for connecting the outer ends of the brake shoes, Fig. 4 is a sectional view taken on the line 4—4 of Fig. 2 and looking in the direction of the arrows, Fig. 5 is a detail perspective view showing a modified form of retaining clip for the brake shoes, and Fig. 6 is a similar view illustrating a still further modified form of retaining clip.

In order that the construction, mounting and operation of my improved brake may be accurately understood, I have shown the device in connection with one rear wheel of a conventional type of motor vehicle. The vehicle wheel is indicated at 10 and one end portion of the rear axle housing of the vehicle at 11. This housing is provided at its adjacent terminal with the usual end plate 12 with which coacts a brake drum 13 carried by the wheel. Journaled through the end plate at its forward side is a cam shaft 14 carrying a cam 15 within the drum and fixed upon the outer end of said shaft is a crank 16 to which is connected a brake rod 17.

Coming now more particularly to the subject of the present invention, I employ companion brake shoes 18. These brake shoes are preferably formed of suitable resilient metal and at their inner ends are provided with inwardly directed radial lugs 19. The lugs abut opposite edge portions of a substantially U-shaped attaching clip 20 for the brake shoes. This attaching clip is also preferably formed of suitable resilient metal and engaging through the free ends of the clip is a bolt 21 which, as particularly shown in Fig. 1, is carried by the plate 12. Extending through the bight of the clip is a supporting pin 22, and, as will now be seen, the bolt 21 may be adjusted for flexing the clip and tightly binding the supporting pin thereon. The pin projects at opposite sides of the clip and the lugs 19 are removably fitted over the end portions of the pin to be supported thereby. Riveted or otherwise secured to the brake shoes are approved brake linings 23. Removably fitted over the ends of the supporting pin 22 to abut the lugs 19 of the brake shoes is a plurality of washers or liners 24 normally carried inactive upon the pin and coacting with the pin for retaining these washers in position thereon as well as also retaining the lugs 19 engaged with the pin, is a retaining clip 25. This retaining clip is preferably formed from a length of suitable resilient wire coiled intermediate of its ends to provide a spring from the ends of which extend reversely presented hooks 26 gripping one around each end portion of the pin. Thus, as will be observed, the spring of the clip is normally distended so that the clip will consequently yieldably bind the liners against the lugs 19 and, of course, also yieldably retain the brake shoes engaged upon the supporting pin therefor. At their outer ends the brake shoes are provided with inwardly directed radial lugs 27 coacting with opposite sides of the cam 15 and struck inwardly from the shoes adjacent their outer ends are lugs or tongues 28 with which are engaged the ends of a spring 29 yieldably holding the lugs 27 of the shoes against the cam.

As will now be readily understood, actuation of the rod 17 to rock the cam 15 will result in expanding the brake shoes so that the brake linings will accordingly be moved to coact with the brake drum for applying the brake. Upon the release of the rod, the spring 29 will then immediately act to retract the brake shoes away from the brake drum. Since continued use of the brake will inevitably cause wear of the brake linings, it becomes necessary to provide some means for taking up this wear. To accomplish this result, the clip 25 is first removed from the pin 22 when one or more of the liners 24 are fitted in active position upon the pin beneath the inner ends of the shoes so as to bear between the lugs 19 and clip 20. The shoes may thus be adjustably spread when the clip 25 may be again applied to the pin for yieldably holding the liners and the lugs of the brake shoes thereon. I accordingly provide an arrangement wherein wear upon the brake linings may be taken up as such wear occurs and in this connection it is to be observed that by providing my improved retaining clip for the inner ends of the shoes, the operation of spreading the shoes is rendered particularly simple while, at the same time, the shoes will normally be effectively held upon their supporting pin.

In Fig. 5 of the drawings I have shown a slightly modified form of shoe retaining clip. This retaining clip, like the preferred form of clip is preferably formed from a length of suitable resilient wire. This length of wire is first bent intermediate of its ends into substantially U-shape so that parallel strands 30 are thus provided. The bight of the clip is then bent to form a laterally directed loop 31 at one end of the clip while the strands 30 are also bent to provide a laterally directed split loop 32 at the opposite end of the clip, this loop confronting the loop 31. The loop 31 may, as will be readily understood in view of the previous description, thus be engaged over one end of the pin 22 when the loop 32 may then be engaged over the opposite end of said pin, so that the loops will abut the liners 24 to be flexed or spread somewhat thereby with the result that the clip will yieldably hold the liners and brake shoes upon the pin. In this connection it is to be observed that the sides of the loops 32 are, adjacent their free ends, bent inwardly toward each other to form shoulders adapted to engage beneath the pin so as to prevent accidental displacement of the clip.

In Fig. 6 of the drawings, I have shown a still further modified form of retaining clip. In this modification, the clip is also preferably formed from a length of suitable resilient wire bent to provide strands 33 corresponding to the strands 30 of the prior modification. At one end the clip is formed with a loop 34 corresponding to the loop 31, and at its opposite end with a split loop 35 corresponding to the split loop 32. Medially of the clip, the strands 33 are twisted together, thus enhancing the rigidity of the clip body.

Having thus described the invention, what is claimed as new is:

1. An internal expending brake including companion brake shoes, means supporting the shoes at their inner ends, and a clip engaging opposite end portions of said supporting means and holding the inner ends of the shoes against displacement therefrom.

2. An internal expanding brake including companion brake shoes, means supporting the shoes at their inner ends, and a clip spanning the inner ends of the shoes and including means engaging said supporting means and yieldably holding said shoe ends thereon.

3. An internal expanding brake including companion brake shoes, supporting means therefor, and a clip engaging opposite end portions of the supporting means for holding the shoe ends thereon, said clip being formed of a length of material bent to provide a spring yieldably holding the clip engaged with the supporting means.

4. An internal expanding brake including companion brake shoes, means supporting the shoes at their inner ends, and a clip coacting with the supporting means for holding the shoe ends thereon, said clip being formed from a length of material bent to provide reversely presented hooks connected by an intermediate spring yieldably holding the hooks to engage the end portions of the supporting means.

5. In an internal expanding brake, the combination of shoe supporting means, companion brake shoes having corresponding end portions thereof fitted over the end portions of said supporting means, and means straddling said end portions of the shoes and engaging the end portions of said supporting means for holding the shoes against displacement therefrom.

6. An internal expanding brake including companion brake shoes, supporting means extending freely through the inner end portions of the shoes, and means free of the shoes spanning said end portions thereof and coacting with said supporting means for retaining the shoes thereon.

7. An internal expanding brake including companion brake shoes, supporting means extending freely through the inner end portions of the shoes, liners normally carried inactive upon the supporting means, and means free of the shoes spanning said ends thereof and engaging said supporting means for retaining the shoes and liners thereon, the liners being insertible beneath the inner ends of the shoes for spreading the shoes.

In testimony whereof I affix my signature.

JOSEPH O. MICHAUD. [L. S.]